(12) United States Patent
Kim et al.

(10) Patent No.: US 7,858,257 B2
(45) Date of Patent: Dec. 28, 2010

(54) FUEL CELL SYSTEM WITH DIFFERENTIAL PRESSURE SENSOR

(75) Inventors: Jinkwang Kim, Yongin-si (KR); Dongyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1127 days.

(21) Appl. No.: 11/528,854

(22) Filed: Sep. 27, 2006

(65) Prior Publication Data

US 2007/0077471 A1     Apr. 5, 2007

(30) Foreign Application Priority Data

Sep. 27, 2005     (KR) .................. 10-2005-0089775

(51) Int. Cl.
*H01M 8/04* (2006.01)
(52) U.S. Cl. .................. 429/443; 429/444; 429/428; 429/430
(58) Field of Classification Search .................. 429/12, 429/22, 25, 400, 443, 444, 428, 430
See application file for complete search history.

(56) References Cited

U.S. PATENT DOCUMENTS 5,723,228 A * 3/1998 Okamoto .................. 429/12
5,766,786 A * 6/1998 Fleck et al. .................. 429/17
6,387,559 B1 * 5/2002 Koripella et al. .............. 429/34
6,528,193 B1 * 3/2003 Kurita .......................... 429/20
7,205,060 B2 * 4/2007 Kaye et al. .................. 429/25

FOREIGN PATENT DOCUMENTS

JP     2000-149973     5/2000
KR    2003-0078974    10/2003

OTHER PUBLICATIONS

Patent Abstracts of Japan, Publication No. 2000-149973, dated May 30, 2000, in the name of Masakazu Hasegawa.
Korean Patent Abstracts, Publication No. 1020030078974 A, dated Oct. 10, 2003, in the name of In Gyu Kim et al.

* cited by examiner

*Primary Examiner*—Patrick Ryan
*Assistant Examiner*—Julian Mercado
(74) *Attorney, Agent, or Firm*—Christie, Parker & Hale, LLP (57) ABSTRACT

A fuel cell system includes a fuel cell stack; a diluted fuel tank for storing diluted fuel; a diluted fuel conduit for supplying the diluted fuel from the fuel dilution tank to the fuel cell stack; a differential pressure sensor in the diluted fuel conduit to sense a differential pressure resulting from a fuel flow inside the diluted fuel conduit and to transmit an electric signal; and a controller for receiving the electric signal from the differential pressure sensor and for determining whether or not fuel is flowing inside the diluted fuel conduit.

25 Claims, 5 Drawing Sheets

FUEL CELL SYSTEM WITH DIFFERENTIAL PRESSURE SENSOR

CROSS-REFERENCE TO RELATED APPLICATION

This application claims priority to and the benefit of Korean Patent Application No. 10-2005-0089775 filed on Sep. 27, 2005, in the Korean Intellectual Property Office, the entire content of which is incorporated herein by reference.

BACKGROUND OF THE INVENTION

Direct methanol fuel cell (DMFC) systems directly supply methanol fuel and oxygen (as an oxidant) to a stack and generate electricity by means of the resulting electrochemical reaction. The stack, which substantially generates electricity in the DMFC systems, has at least one unit cell stacked thereon, which includes a membrane electrode assembly (hereinafter, referred to as MEA) and a separator (or bipolar plate). The MEA includes an anode, a cathode, and an electrolyte membrane interposed between the anode and the cathode. Each of the anode and cathode includes a fuel diffusion layer for supply and diffusion of fuel, a catalyst layer in which oxidation/reduction reactions of fuel occur, and an electrode supporter. The catalyst layer is typically made of noble metal, such platinum. A catalyst made of an alloy of a transition metal, such as ruthenium, rhodium, osmium, or nickel, may be used for the anode, in order to prevent catalyst poisoning caused by carbon monoxide, which is a reaction by-product. The electrode supporter is made of carbon paper or carbon fabric and is waterproofed so as to easily supply fuel and discharge reaction products. The electrolyte membrane is a polymer membrane having a typical thickness of 50-200 μm. Particularly, the electrolyte membrane is a hydrogen ion exchange membrane, which contains moisture and has ion conductivity.

Electrode reactions occurring at the stack of DMFC systems include an anode reaction, by which supplied fuel oxidizes, and a cathode reaction, by which oxygen in the supplied air reacts with hydrogen ions from the anode and reduces. More particularly, a. anode reaction:

$$CH_3OH + H_2O \rightarrow CO_2 + 6H^+ + 6e^- \quad \text{(reaction formula 1)}$$

b. cathode reaction:

$$3/2 O_2 + 6H^+ + 6e^- \rightarrow 3H_2O \quad \text{(reaction formula 2)}$$

c. overall reaction:

$$CH_3OH + 3/2 O_2 \rightarrow 2H_2O + CO_2 \quad \text{(reaction formula 3)}$$

At the anode, where the oxidation reaction (reaction formula 1) occurs, carbon dioxide, hydrogen ions, and electrons are created by a reaction between methanol and water, and the created hydrogen ions are transmitted to the cathode via the electrolyte membrane. At the cathode, where the reduction reaction (reaction formula 2) occurs, water is created by a reaction among the hydrogen ions, electrons transmitted via an external circuit, and oxygen. In the overall reaction (reaction formula 3) of DMFC systems, methanol and oxygen react with each other and create water and carbon dioxide. Particularly, one molecule of methanol reacts with oxygen and creates two molecules of water.

The fuel supplied to the anode is typically not pure methanol, but a mixture of water and methanol adjusted to a predetermined concentration. When high-concentration methanol is used, crossover occurs via the electrolyte membrane (i.e. fuel passes through the ion exchange membrane). This degrades the generation performance of the fuel cell. Therefore, it is customary to use low-concentration methanol of 0.5-2M (2-8 vol %).

Therefore, for DMFC systems, methanol fuel of a predetermined concentration is continuously supplied to the anode, and, to this end, pure methanol and water, which is collected from the cathode, are supplied to a fuel mixing device. In addition, air is continuously supplied to the cathode. In conventional DMFC systems, a pump is used to supply pure methanol, methanol fuel, and water, and the amount of supply is adjusted by controlling the capacity and number of pumps. For the air supply, the DMFC systems generally use a pump or a blower.

However, conventional DMFC systems have a problem in that it is difficult to monitor in real-time whether or not methanol, for example, is continuously supplied during operation. For example, monitoring an interruption in the fuel supply due to a problem of the conduit that connects the pump to the stack while the pump is running properly can be difficult. Particularly, in the case of a DMFC system used in a mobile communication device or laptop computer, the diameter of the conduit, through which fuel flows, is typically reduced due to the small size of the system. This increases the possibility of a problem in the conduit and, as a result, makes it harder to monitor such a problem. Furthermore, the same problem may occur in conduit carrying air.

SUMMARY

A fuel cell system includes a fuel cell stack; a fuel tank for storing a liquid fuel; a fuel dilution tank for mixing the liquid fuel from the fuel tank with water and un-reacted fuel discharged from the fuel cell stack; a concentrated fuel conduit for supplying the liquid fuel from the fuel tank to the fuel dilution tank; a diluted fuel conduit for supplying diluted fuel from the fuel dilution tank to the fuel cell stack; a first differential pressure sensor in a one of the concentrated fuel conduit and the diluted fuel conduit and adapted to sense a differential pressure resulting from fuel flow inside the one of the conduits and to transmit an electric signal; and a controller for receiving the electric signal from the first differential pressure sensor and for determining whether or not fuel is flowing inside the one of the conduits.

One embodiment also includes a second differential pressure sensor in the other of the conduits to sense a differential pressure resulting from fuel flow inside the other of the conduits and to transmit an electric signal.

An air conduit may also be connected to the fuel cell stack and an air supply device for supplying air via the air conduit and, in one embodiment, a second differential pressure sensor is positioned in the air conduit.

In another embodiment, the first differential pressure sensor has a sensing unit for sensing a pressure difference between opposite sides of the sensing unit, an input/output terminal electrically connected to the sensing unit, and first and second sensing conduits, each having an end connected to a respective side of the sensing unit and a different end in the one of the conduits. The sensing unit may have a board having a through-hole, an insulation film formed on an upper portion of the board in a region including the through-hole, and a piezoelectric film formed on an upper portion of the insulation film. In various embodiments, the insulation film is made of nitride or oxide, and the piezoelectric film is made of PZT (PbZrO3-PbTiO3 solid solution) material.

In an embodiment, the input/output terminal has an input terminal electrically connected to the piezoelectric film to apply a voltage and an output terminal for outputting a voltage generated by the piezoelectric film.

In another embodiment, the first and second sensing conduits have respective openings positioned inside the one of the conduits so as to face opposite directions, and the opening of the first sensing conduit is aligned in a direction opposite to a direction of the fuel flow, the opening of the second sensing conduit is aligned in a substantially identical direction as the direction of the fuel flow, and the first differential pressure sensor is adapted to sense the differential pressure based on different pressures created inside the respective first and second sensing conduits.

The first differential pressure sensor may have protective film formed on upper and lower portions of the sensing unit, and the protective film may be made of an organic material having a resistance to fuel flowing inside the one of the conduits.

The controller may have a warning means for indicating whether or not flow inside the one of the conduits is interrupted in accordance with the electric signal from the first differential pressure sensor. The controller may also be adapted to control a driving rate of the fuel supply pump in accordance with the electric signal from the first differential pressure sensor.

The liquid fuel may be, for example, methanol or ethanol.

Another embodiment of a fuel cell system includes a fuel cell stack; a diluted fuel tank for storing diluted fuel; a diluted fuel conduit for supplying the diluted fuel from the fuel dilution tank to the fuel cell stack; a differential pressure sensor in the diluted fuel conduit to sense a differential pressure resulting from a fuel flow inside the diluted fuel conduit and to transmit an electric signal; and a controller for receiving the electric signal from the differential pressure sensor and for determining whether or not fuel is flowing inside the diluted fuel conduit.

BRIEF DESCRIPTION OF THE DRAWINGS

The above and other aspects and features of the present invention will be more apparent from the following detailed description taken in conjunction with the accompanying drawings, in which.

DETAILED DESCRIPTION

Hereinafter, examples of embodiments of the present invention will be described with reference to the accompanying drawings, in which the same reference numerals are used to designate the same or similar components.

Figure 1:
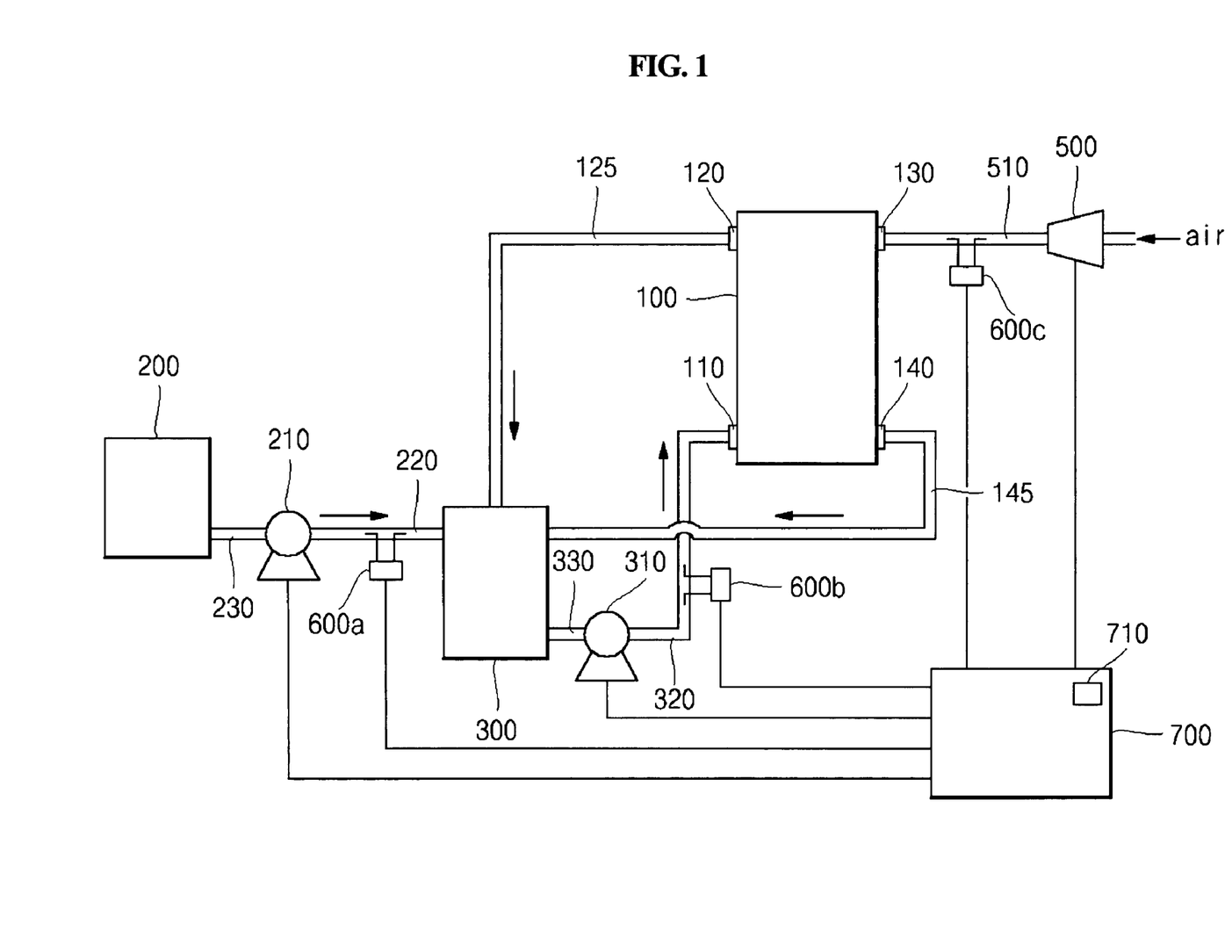
FIG. 1 is a block diagram showing the overall construction of a fuel cell system according to an embodiment of the present invention.

Referring to FIG. 1, a fuel cell system according to an embodiment of the present invention includes a stack 100, a fuel tank 200, a liquid fuel pump 210, a fuel dilution tank 300, a fuel supply tank 310, differential pressure sensors 600a, 600b, 600c, and a controller 700. The fuel cell system may further include an air supply device 500 for supplying the stack with air. The fuel cell system according to this embodiment adopts the principle of a DMFC system, in which fuel (e.g. methanol) is supplied in a liquid state and oxygen is supplied in a gaseous state to generate electric energy by means of an electrochemical reaction.

The stack 100 has at least one unit cell stacked thereon, which includes an MEA and a bipolar plate. The MEA includes an anode, a cathode, and an electrolyte membrane interposed between the anode and cathode. Each of the anode and cathode includes a fuel diffusion layer for supply and diffusion of fuel, a catalyst layer in which oxidation/reduction reactions of fuel occur, and an electrode supporter. The anode is supplied with fuel, which has been diluted from the fuel dilution tank 300 via one side 110 and discharges carbon dioxide, which is a reaction by-product, and un-reacted fuel via the other side 120. The un-reacted fuel discharged from the anode is collected by the fuel dilution tank via a conduit, which connects the anode to a fuel dilution tank 300. The cathode is supplied with air via one side 130 and discharges un-reacted air and water, which is a reaction by-product, via the other side 140. The water discharged via the other side of the cathode is collected by the fuel dilution tank 300 and is used to dilute concentrated liquid fuel to a predetermined concentration.

The fuel tank 200 stores concentrated liquid fuel, which is used by the fuel cell system, and has a liquid fuel pump 210 and a liquid fuel conduit 220 successively connected to one side thereof. The liquid fuel pump 210 may be directly connected to the fuel tank 200 or connected thereto via a separate conduit 230. The fuel tank 200 stores methanol or ethanol, depending on the type of fuel used.

The liquid fuel pump 210 is connected to the liquid fuel conduit 220 and supplies fuel from the fuel tank 200. The liquid fuel pump 210 may be any type of pump, as long as it can supply a liquid.

The fuel dilution tank 300 mixes concentrated liquid fuel, which is supplied from the fuel tank 200, with un-reacted fuel and water (reaction by-product), which are discharged from the other sides 120 and 140 of the respective anode and cathode of the stack 100, and dilutes the fuel to a desired concentration. The liquid fuel conduit 220 of the fuel tank 200 is connected to the fuel dilution tank 300, together with conduits 125 and 145 connected to the other sides 120 and 140 of the anode and cathode of the stack 100, respectively. When the liquid fuel pump 210 connected to the fuel tank 200 is running, the fuel dilution tank 300 is supplied with concentrated liquid fuel from the fuel tank 200 via the liquid fuel conduit 220. In addition, the fuel dilution tank 300 is supplied with un-reacted fuel and water via the conduits 125 and 145 respectively connected to the stack 100. The concentration of fuel in the fuel dilution tank 300 is adjusted in accordance with the amount of concentrated liquid fuel supplied from the fuel tank 200.

One side of the fuel supply pump 310 is connected to the fuel dilution tank 300, and the other side thereof is connected to one side of the anode of the stack 100 via a diluted fuel conduit 320. The fuel supply pump 310 supplies fuel from the fuel dilution tank 300 to the anode of the stack 100 via the diluted fuel conduit 320. The fuel supply pump 310 may be any type of pump, as long as it can feed a liquid, as in the case of the liquid fuel pump. The fuel dilution tank 300 may be directly connected to the fuel supply pump 310 or connected thereto via a separate conduit 330.

Figure 2:
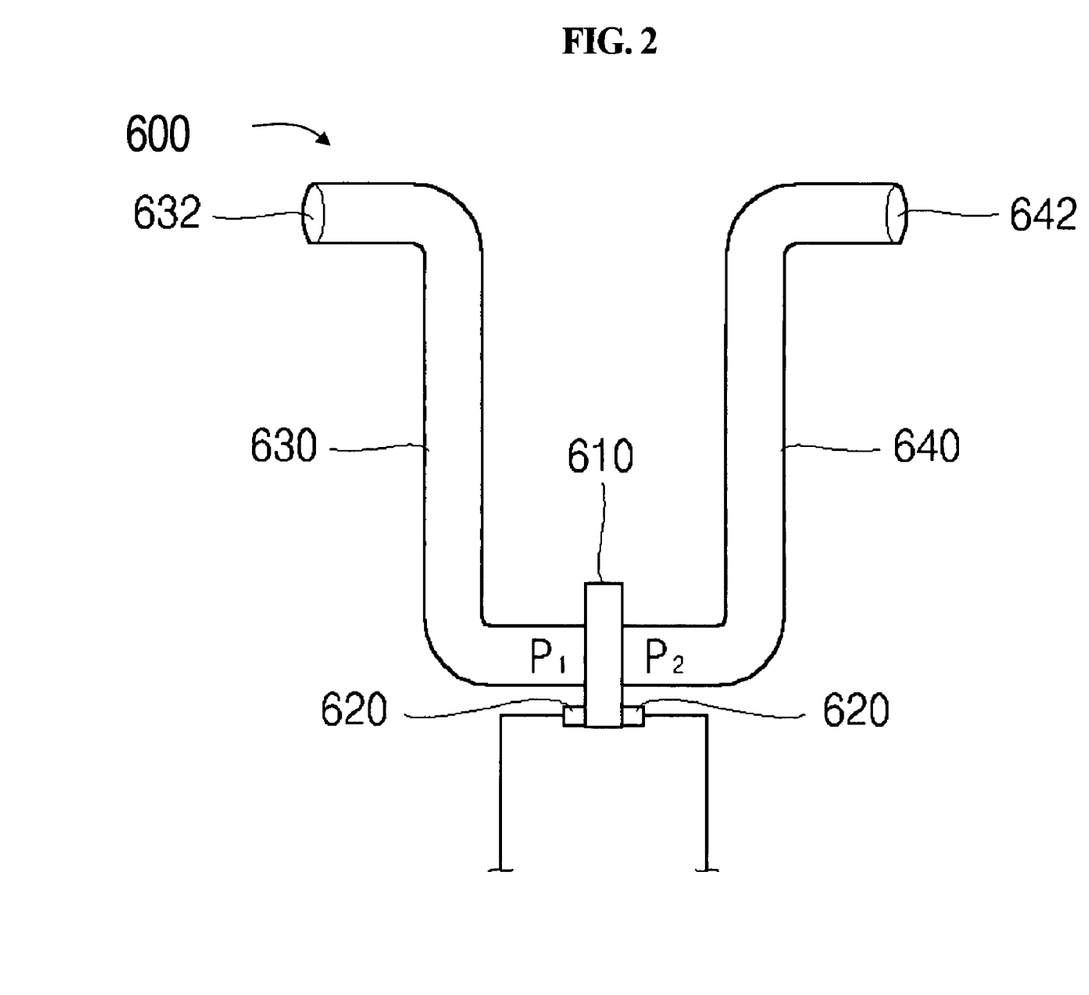
FIG. 2 shows the construction of a differential pressure sensor according to an embodiment of the present invention.

Referring to FIG. 2, the differential pressure sensor 600 includes a sensing unit 610, an input/output terminal 620, and first and second sensing conduits 630 and 640 connected to respective sides of the sensing unit 610, as well as to a fuel conduit, so that a pressure difference is created between both sides of the sensing unit 610 based on the flow inside the fuel conduit. It is assumed in the following description that the differential pressure sensor 600 is installed in the diluted fuel conduit 320. If necessary, the differential pressure sensor is given reference numeral 600a, 600b, or 600c, as shown in FIG. 1, depending on the type of conduit in which the differential pressure sensor is installed.

Referring to FIGS. 1 and 2, the differential pressure sensor 600 is installed in at least one of the liquid fuel conduit 220 (600a) and the diluted fuel conduit 320 (600b) and senses a pressure difference occurring between both sides of the sensing unit 610 based on the flow of diluted fuel or concentrated liquid fuel. The differential pressure sensor 600 generates an electric signal based on the pressure difference and transmits the signal to a controller 700, which is electrically connected to the differential pressure sensor 600.

Figure 3:
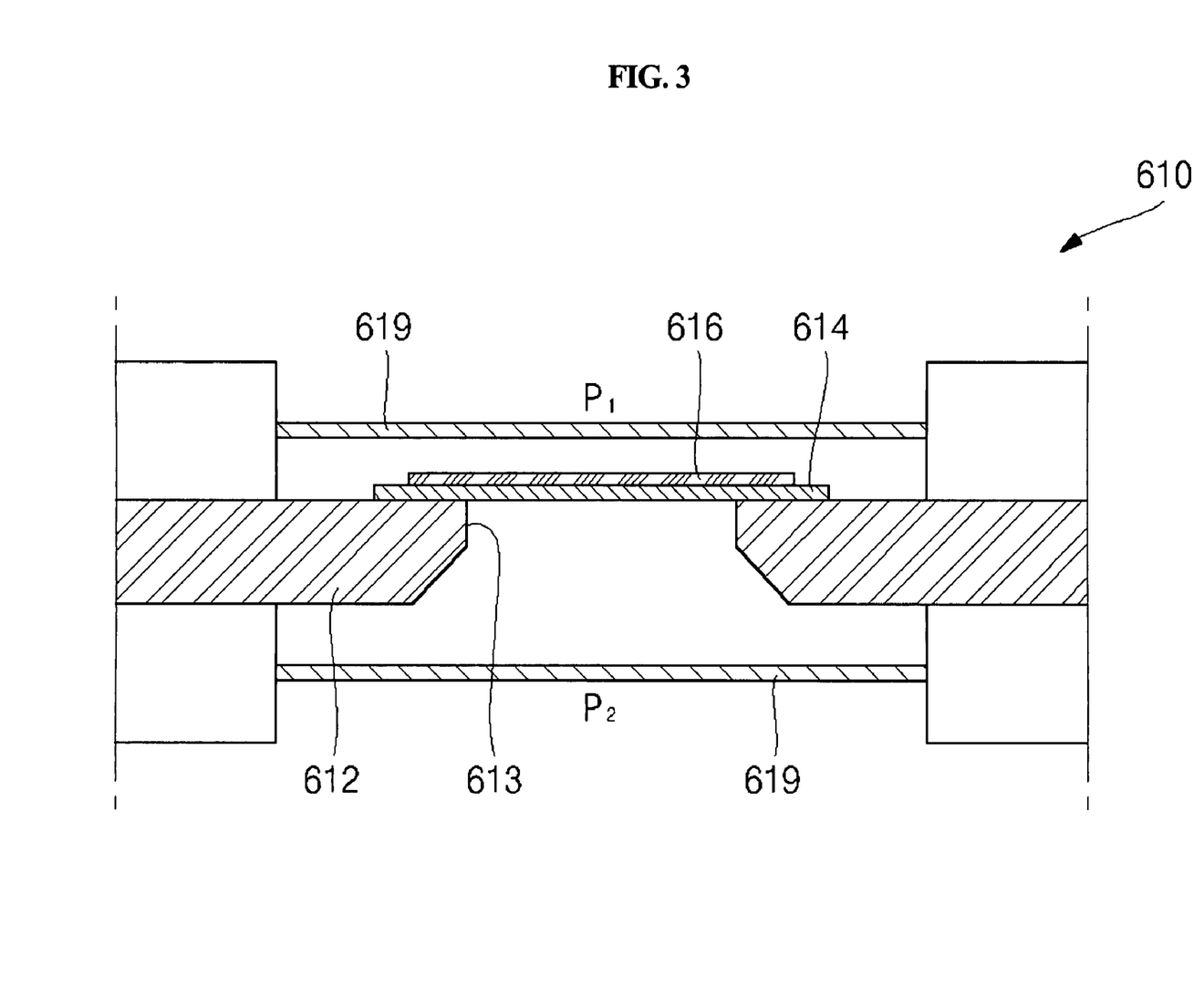
FIG. 3 is a sectional view showing a sensing unit of the differential pressure sensor shown in FIG. 2.

Referring to FIG. 3, the sensing unit 610 includes a board 612, insulation film 614, and piezoelectric film 616. The sensing unit 610 may further include a protective film 619 for preventing the insulation film 614 and the piezoelectric film 616 from making contact with fuel flowing into the sensing unit 610. The sensing unit 610 is electrically connected to the input/output terminal and transmits an electric signal based on the pressure difference between both sides thereof.

The board 612 may be an approximately planar semiconductor board. The board 612 has a through-hole 613 extending through it in a vertical direction.

The insulation film 614 is formed on top of the board 612 in a region including the through-hole 613 by using an insulation film and seals the through-hole 613. The insulation film 614 may be made of a nitride, such as silicon nitride (SiN), or an oxide, such as silicon dioxide ($SiO_2$).

Figure 4:
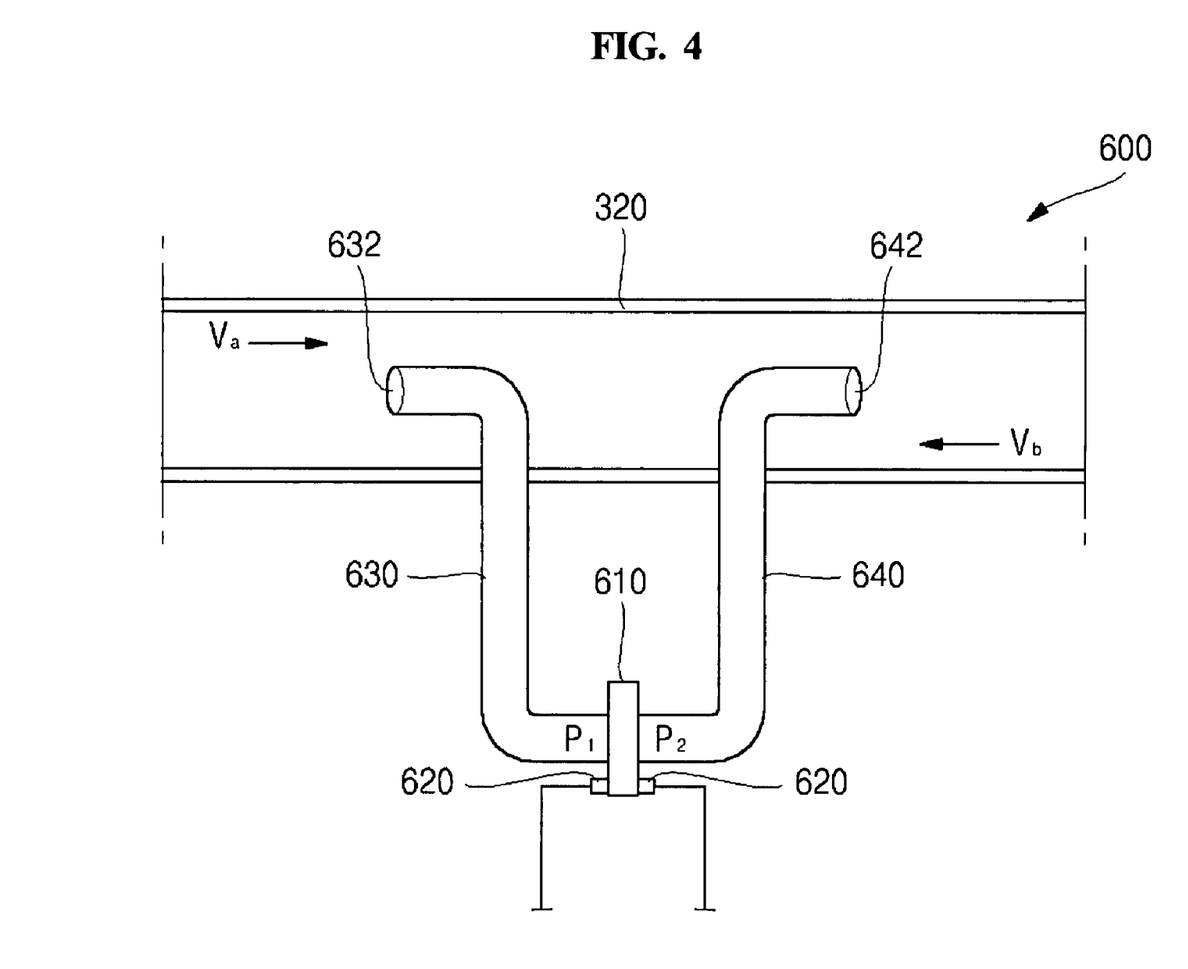
FIG. 4 shows the construction of the differential pressure sensor shown in FIG. 2 during operation.

The piezoelectric film 616 may be made of any type of piezoelectric material, such as PZT ($PbZrO_3$-$PbTiO_3$ solid solution), but the material is not limited to that herein. The piezoelectric film 616 is formed on the upper surface of the insulation film 614 in a region including the through-hole 613. The piezoelectric film 610 is deformed by a pressure difference between both sides thereof and establishes an electric field. Referring to FIGS. 3 and 4, the piezoelectric film 616 is electrically connected to the input/output terminal 620, so that the piezoelectric film 616 is able to transmit a voltage, which varies in accordance with the electric field established by the piezoelectric film 616 itself as it deforms, via the output terminal.

The protective film 619 is formed on the top and bottom of the sensing unit 610 and isolates the piezoelectric film 616 and the insulation film 614 from the outside. More particularly, the protective film 619 is formed on the top of the piezoelectric film 616 and prevents it from making direct contact with fuel, which flows into the differential pressure sensor. In addition, the protective film 619 is formed on the bottom of the insulation film 614 and prevents it from making direct contact with fuel.

The protective film 619 transmits pressure, which is created by fuel, to both sides of the piezoelectric film 616 as accurately as possible. Therefore, the protective film 619 is made of a thin material, which is easily deformed by pressure. In one embodiment, the protective film 619 is made of an organic material having resistance to the fuel that is used. The protective film 619 may be made of a nitride or an oxide, as in the case of the insulation film.

The protective film 619 may be spaced from the upper surface of the piezoelectric film 619 or brought into contact with the upper surface thereof. The protective film 619 may be spaced from the lower surface of the board 612 or brought into contact with the lower surface thereof. If the distance between the protective film 619 and the piezoelectric film 616 is too large, the air layer existing between the protective film 619 and the piezoelectric film 616 may absorb the pressure, which is created by fuel, and reduce the amount of pressure transmitted to the piezoelectric film 616.

The input/output terminal 620 includes an input terminal and an output terminal, which are electrically connected to the piezoelectric film 616 of the sensing unit 610 such that a change of voltage can be measured across the piezoelectric film 616 when it is deformed. Although a specific interconnection between the input/output terminal 620 and the piezoelectric film 616 is not illustrated, those skilled in the art can easily select and configure a suitable interconnection.

Referring to FIGS. 1-4, the first and second sensing conduits 630 and 640 are made of a conduit having a predetermined diameter, which may be the same diameter for both conduits 630 and 640. The diameter of the first and second sensing conduits 630 and 640, in one embodiment, is smaller than half the diameter of the fuel conduit in which they are installed in order to reduce their influence on the flow of fuel inside the conduit. The first and second sensing conduits 630 and 640 are connected at one end to respective sides of the sensing unit 610 and are installed inside the diluted fuel conduit 320 or the liquid fuel conduit 220 at their opposite ends. In one embodiment, openings of the first and second sensing conduits 630 and 640 face opposite directions inside the diluted fuel conduit 320 or the liquid fuel conduit 220. Particularly, the opening of the first sensing conduit 630 faces a direction opposite to the direction of fluid flow, and the opening of the second sensing conduit 640 faces the same direction as the direction of fluid flow. As a result, when the fuel flows at a constant velocity inside the diluted fuel conduit 320 or the liquid fuel conduit 220, a difference between pressures created in the first and second sensing conduits 630 and 640 occurs.

A process of sensing the flow of fuel inside the diluted fuel conduit 320 by the differential pressure sensor 600 will now be described.

It is assumed that, as shown in FIG. 4, fuel flows at a velocity of $V_a$ inside the diluted fuel conduit 320. The first sensing conduit 630 of the differential pressure sensor 600 has an opening positioned inside the diluted fuel conduit 320 so as to face in the opposite direction to the flow of fuel, and the second sensing conduit 640 has an opening positioned therein so as to face the same direction as the flow of fuel.

According to Bernoulli's theorem, the pressure difference $\Delta P$ between pressures created inside the first and second sensing conduits 630 and 640 of the differential pressure sensor 600 has a relationship, as given in following Equation 1, with the velocity of fuel flowing inside the diluted fuel conduit 320. Particularly, the pressure difference $\Delta P$ can be obtained from Equation 1a. The pressure created inside the first sensing conduit 630 is referred to as $P_1$, and that inside the second sensing conduit 640 is referred to as $P_2$. The fuel has a velocity of 0 (zero) in the first sensing conduit 630, which is positioned in the opposite direction to the flow of fuel inside the diluted fuel conduit 320.

$$Va = \sqrt{2g/\gamma(P1-P2)} = \sqrt{2/\rho(P1-P2)} \qquad \text{Equation 1}$$

$$\Delta P = \gamma Va^2/2g \qquad \text{Equation 1a}$$

where g is gravitational acceleration, γ is specific weight, and ρ is concentration.

The flow rate Q inside the diluted fuel conduit 320 has a relationship as given in following Equation 2.

$$Q = AVa = A\sqrt{2g/\gamma(P1-P2)} \qquad \text{Equation 2}$$

where A is the diameter of the diluted fuel conduit 320 in which the differential pressure sensor 600 is installed.

When no fuel flows inside the diluted fuel conduit 320 (i.e. $V_a=0$), the differential pressure sensor 600 senses no pressure difference ($\Delta P=0$). When fuel flows at a velocity of $V_a$ inside the diluted fuel conduit 320, the differential pressure sensor 600 senses a pressure difference $\Delta P$ between both sides of the piezoelectric film 616. The differential pressure sensor 600 transmits an electrical signal, which corresponds to the sensed pressure difference, to the controller 700, which is then informed that fuel is normally flowing inside the diluted fuel conduit 320.

In addition, when the relationship between the pressure difference $\Delta P$ sensed by the differential pressure sensor 600 and the velocity $V_a$ of fuel inside the diluted fuel conduit 320 has been determined, Equations 1 and 2 give the velocity and flow rate of fuel flowing inside the diluted fuel conduit 320. As a result, the fuel cell system can properly control the flow rate of fuel flowing inside the diluted fuel conduit 320, based on the pressure difference P sensed by the differential pressure sensor 600.

Although the above description is based on a case in which fuel flows at a velocity of $V_a$ inside the diluted fuel conduit 320, the differential pressure sensor 600 can sense the flow of fuel in the same manner even when fuel flows at a velocity $V_b$ in the opposite direction. This means that, when fuel is supplied to the stack 100 via the diluted fuel conduit 320 in the fuel cell system, any reverse flow of fuel inside the diluted fuel conduit 320 can be detected. For example, when fuel does not flow due to blockage of a part of the diluted fuel conduit 320 or the stack 100, or when fuel flows in the opposite direction due to fracture of the conduit or malfunctioning of the pump, the differential pressure sensor 600 can promptly detect that condition.

Furthermore, although it has been assumed that the differential pressure sensor 600a is installed inside the diluted fuel conduit 320, the same description holds when the differential pressure sensor 600b is installed inside the liquid fuel conduit 220.

The controller 700 is electrically connected to the differential pressure sensor 600 to receive the electric signal from it and determines whether or not fuel flows inside the diluted fuel conduit 320 or the liquid fuel conduit 220. When the relationship between the pressure difference sensed by the differential pressure sensor 600, which is installed in the diluted fuel conduit 320 or the liquid fuel conduit 220, and the velocity of fuel has been determined, as mentioned above, the controller 700 can property control the flow rate inside the diluted fuel conduit 320 or the liquid fuel conduit 220, based on the electric signal from the differential pressure sensor 600. In this case, the controller 700 is electrically connected to the fuel supply pump 310 and the liquid fuel pump 210 and controls their driving rates.

The controller 700 may further include a warning device 710 for warning the operator when the flow of fuel is interrupted inside the conduit in which the differential pressure sensor 600 is installed. The warning device 710 is actuated by a signal from the controller 700. The warning device 710 may be an alarm, a text display, or other type of device.

The air supply device 500 is connected to one side 130 of the cathode of the stack 100 and supplies air to the stack. A separate air conduit 510 is installed between the air supply device 500 and the cathode, and a differential pressure sensor 600c may be installed inside the air conduit 510. As a result, the differential pressure sensor 600c can determine whether or not air is properly flowing inside the air conduit 510. The operation of the differential pressure sensor 600c installed inside the air conduit 510 is the same as that of the differential pressure sensor 600a installed inside the diluted fuel conduit, and repeated description thereof will be omitted herein. The air supply device 500 may be any type of air supply means, such as an air pump or air blower.

A fuel cell system according to another embodiment of the present invention will now be described.

Figure 5:
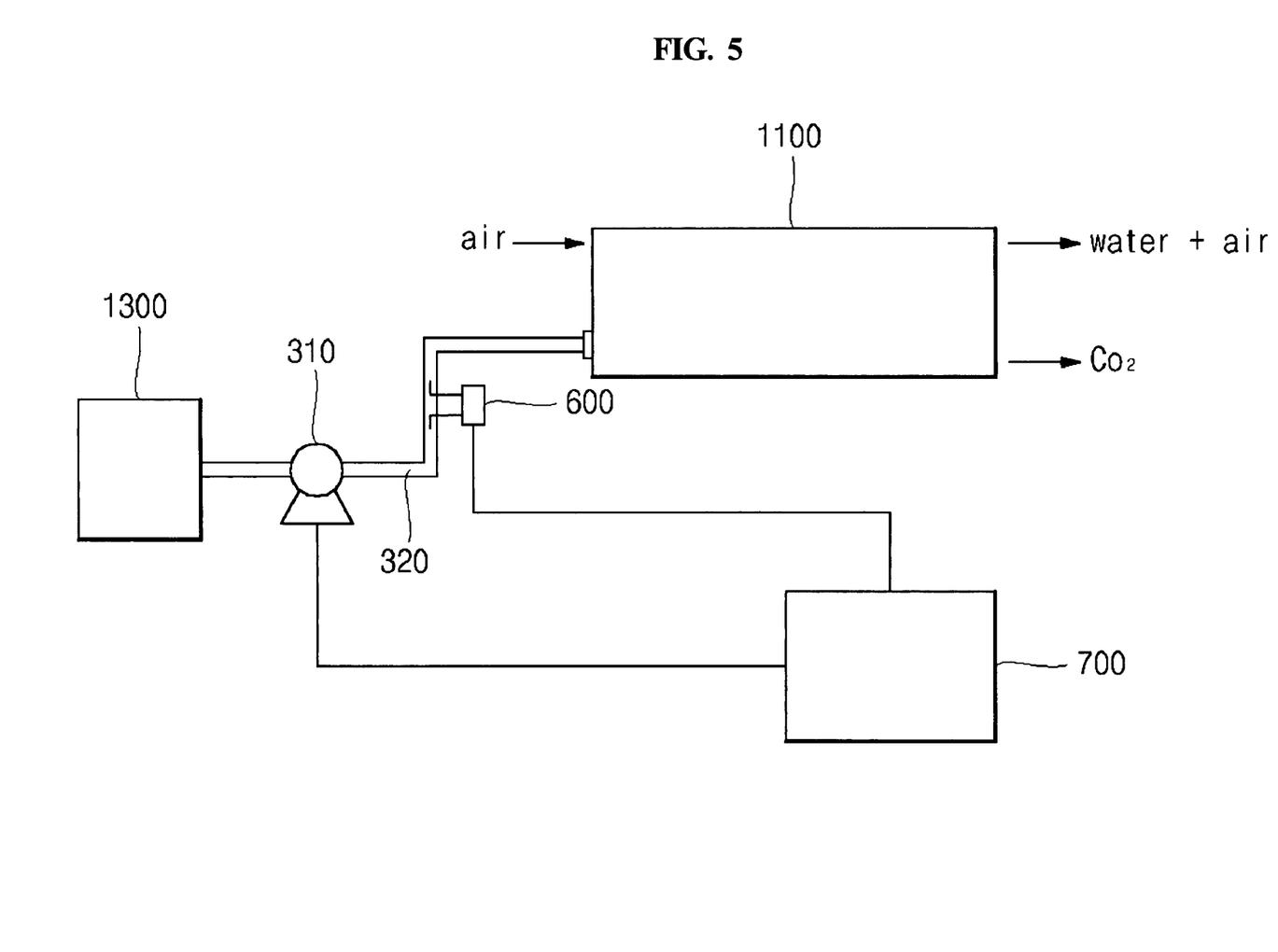
FIG. 5 is a block diagram showing a fuel cell system according to another embodiment of the present invention.

FIG. 5 is a block diagram showing a fuel cell system according to another embodiment of the present invention. In the following description of the fuel cell system according to another embodiment of the present invention, the same or similar components as in the embodiment described with reference to FIGS. 1 to 4 are given the same reference numerals, without repeating the same description, and different components will be described in more detail.

The fuel cell system according to the embodiment shown in FIG. 5 includes a stack 1100, a diluted fuel tank 1300, a fuel supply pump 310, a differential pressure sensor 600, and a controller 700. In the fuel cell system, fuel is supplied by an external motive source, but air is supplied in a natural convection mode. Therefore, the fuel cell system is referred to as a semi-passive type DMFC system.

The stack 1100 is directly supplied with fuel (e.g. methanol), the concentration of which has been pre-adjusted, via its anode. This means that the fuel cell system does not need to include a separate device for diluting fuel. The stack 1100 is not supplied with air by an air supply device (e.g. air pump or air blower), but by natural convection. Therefore, the stack 1100 emits air and water, which are reaction by-products, via its cathode to the atmosphere without collecting water. If necessary, the stack 1100 may be adapted to collect a part of the water and supply it to the anode. The stack 1100 has a planar shape, not a laminated structure, so that air is properly supplied to the cathode.

The diluted fuel tank 1300 stores fuel, the concentration of which has been adjusted to a value necessary for a reaction in the stack 1100. The fuel is supplied from the outside, after its concentration has been adjusted, and does not undergo a separate fuel dilution process in the system. The diluted fuel tank 1300 may be configured as a cartridge type so that it can be replaced when the fuel therein is used up.

The fuel supply pump 310 is installed between the diluted fuel tank 1300 and the anode of the stack 1100 and supplies fuel from the diluted fuel tank 1300 to the stack 1100. The fuel supply pump 310 is connected to the stack 1100 via a diluted fuel conduit 320 and supplies the stack 1100 with fuel via the diluted fuel conduit 320.

The differential pressure sensor 600 is installed in the diluted fuel conduit 320 between the fuel supply pump 310 and the stack 1100 and is adapted to monitor whether or not fuel is flowing inside the diluted fuel conduit 320 and to measure the flow rate. Because the differential pressure sensor 600 has already been described in detail, repeated description thereof will be omitted.

The controller 700 is electrically connected to the differential pressure sensor 600 to transmit/receive electric signals and controls it. The controller 700 is electrically connected to the fuel supply pump 310 and controls its driving.

Although the differential pressure sensor has been described with reference to the fuel cell systems constructed as shown in FIGS. 1 and 5, the construction of the fuel cell systems is not limited to that herein, and the differential pressure sensor is applicable to various fuel cell systems using a fuel supply pump.

The fuel cell system according to the above-described embodiments is advantageous in that a differential pressure sensor is installed inside a conduit, through which fuel flows, whereby the sensor accurately monitors in real-time whether or not the fuel is normally flowing inside the conduit.

In addition, the differential pressure sensor measures the flow rate of fuel inside the conduit in real-time. This makes it possible to control the amount of fuel supplied and to improve the fuel efficiency.

Furthermore, the differential pressure sensor can measure the flow rate even when the fuel flows in the opposite direction. This means that, when the flow of fuel is reversed by a problem in the stack or the diluted fuel conduit, the differential pressure sensor detects it so that the operator can properly deal with it.

Although examples of embodiments of the present invention have been described for illustrative purposes, those skilled in the art will appreciate that various modifications, additions and substitutions are possible, without departing from the scope and spirit of the invention as defined in the accompanying claims and their equivalents.

What is claimed is:

1. A fuel cell system comprising:
    a fuel cell stack;
    a fuel tank for storing a liquid fuel;
    a fuel dilution tank for mixing the liquid fuel from the fuel tank with water and un-reacted fuel discharged from the fuel cell stack;
    a concentrated fuel conduit for supplying the liquid fuel from the fuel tank to the fuel dilution tank;
    a diluted fuel conduit for supplying diluted fuel from the fuel dilution tank to the fuel cell stack;
    a differential pressure sensor in one of the concentrated fuel conduit or the diluted fuel conduit and adapted to sense a differential pressure resulting from fuel flow inside the one of the conduits and to transmit an electric signal corresponding to the fuel flow.

2. The fuel cell system as claimed in claim 1, wherein the differential pressure sensor is a first differential pressure sensor and the electric signal is a first electric signal, the fuel cell system further comprising a second differential pressure sensor in the other of the conduits to sense a differential pressure resulting from fuel flow inside the other of the conduits and to transmit a second electric signal.

3. The fuel cell system as claimed in claim 1, further comprising an air conduit connected to the fuel cell stack and an air supply device for supplying air via the air conduit.

4. The fuel cell system as claimed in claim 3, wherein the differential pressure sensor is a first differential pressure sensor, the fuel cell system further comprising a second differential pressure sensor in the air conduit.

5. The fuel cell system as claimed in claim 1, further comprising a warning device for indicating whether or not flow inside the one of the conduits is interrupted in accordance with the electric signal from the differential pressure sensor.

6. The fuel cell system as claimed in claim 1 further comprising a controller adapted to control a driving rate of a fuel supply pump in accordance with the electric signal from the differential pressure sensor.

7. The fuel cell system as claimed in claim 1, wherein the liquid fuel is methanol or ethanol.

8. A fuel cell system comprising:
    a fuel cell stack;
    a fuel tank for storing a liquid fuel;
    a fuel dilution tank for mixing the liquid fuel from the fuel tank with water and un-reacted fuel discharged from the fuel cell stack;
    a concentrated fuel conduit for supplying the liquid fuel from the fuel tank to the fuel dilution tank;
    a diluted fuel conduit for supplying diluted fuel from the fuel dilution tank to the fuel cell stack;
    a differential pressure sensor in one of the concentrated fuel conduit or the diluted fuel conduit and adapted to sense a differential pressure resulting from fuel flow inside the one of the conduits and to transmit an electric signal corresponding to the fuel flow, wherein the differential pressure sensor comprises a sensing unit for sensing a pressure difference between opposite sides of the sensor, an output terminal electrically connected to the sensing unit, and first and second sensing conduits, each having an end connected to a respective side of the sensing unit and an opposite end in the one of the conduits.

9. The fuel cell system as claimed in claim 8, wherein the sensing unit comprises a board having a through-hole, an insulation film formed on an upper portion of the board in a region including the through-hole, and a piezoelectric film formed on an upper portion of the insulation film.

10. The fuel cell system as claimed in claim 9, wherein the insulation film is made of a nitride or an oxide.

11. The fuel cell system as claimed in claim 9, wherein the piezoelectric film is made of PZT ($PbZrO_3$-$PbTiO_3$ solid solution) material.

12. The fuel cell system as claimed in claim 8, wherein the first and second sensing conduits have respective openings positioned inside the one of the conduits so as to face opposite directions.

13. The fuel cell system as claimed in claim 12, wherein the opening of the first sensing conduit is aligned in a direction opposite to a direction of the fuel flow, the opening of the second sensing conduit is aligned in a substantially identical direction as the direction of the fuel flow, and the differential pressure sensor is adapted to sense the differential pressure based on different pressures created inside the respective first and second sensing conduits.

14. The fuel cell system as claimed in claim 8, wherein the differential pressure sensor has a protective film formed on upper and lower portions of the sensing unit.

15. The fuel cell system as claimed in claim 14, wherein the protective film comprises an organic material having a resistance to fuel flowing inside the one of the conduits.

16. A fuel cell system comprising:
    a fuel cell stack;
    a diluted fuel tank for storing diluted fuel;
    a diluted fuel conduit for supplying the diluted fuel from the fuel dilution tank to the fuel cell stack;
    a differential pressure sensor in the diluted fuel conduit to sense a differential pressure resulting from a fuel flow inside the diluted fuel conduit and to transmit an electric signal; and
    a controller for receiving the electric signal from the differential pressure sensor and for determining whether or not fuel is flowing inside the diluted fuel conduit.

17. The fuel cell system as claimed in claim 16, wherein the diluted fuel is methanol or ethanol.

18. A fuel cell system comprising:
    a fuel cell stack;
    a diluted fuel tank for storing diluted fuel;
    a diluted fuel conduit for supplying the diluted fuel from the fuel dilution tank to the fuel cell stack;
    a differential pressure sensor in the diluted fuel conduit to sense a differential pressure resulting from a fuel flow inside the diluted fuel conduit and to transmit an electric signal, wherein the differential pressure sensor comprises a sensing unit for sensing a pressure difference between opposite sides of the sensor, an output terminal electrically connected to the sensing unit, and first and second sensing conduits, each having an end connected to a respective side of the sensing unit and an opposite end in the diluted fuel conduit; and a controller for receiving the electric signal from the differential pressure sensor and for determining whether or not fuel is flowing inside the diluted fuel conduit.

19. The fuel cell system as claimed in claim 18, wherein the sensing unit has a board having a through-hole, an insulation film formed on an upper portion of the board in a region including the through-hole, and a piezoelectric film formed on an upper portion of the insulation film.

20. The fuel cell system as claimed in claim 19, wherein the insulation film is made of a nitride or an oxide.

21. The fuel cell system as claimed in claim 19, wherein the piezoelectric film is made of PZT ($PbZrO_3$-$PbTiO_3$ solid solution) material.

22. The fuel cell system as claimed in claim 18, wherein the first and second sensing conduits have openings positioned in the diluted fuel conduit so as to face opposite directions.

23. The fuel cell system as claimed in claim 22, wherein the opening of the first sensing conduit is aligned in a direction opposite to the fuel flow, the opening of the second sensing conduit is positioned in a substantially identical direction as the fuel flow, and the differential pressure sensor is adapted to sense the differential pressure based on different pressures created inside the respective first and second sensing conduits.

24. The fuel cell system as claimed in claim 18, wherein the differential pressure sensor includes a protective film formed on upper and lower portions of the sensing unit.

25. The fuel cell system as claimed in claim 24, wherein the protective film is made of an organic material having a resistance to fuel flowing inside the diluted fuel conduit.

* * * * *